United States Patent [19]

Takeda et al.

[11] 4,045,804
[45] Aug. 30, 1977

[54] FOCUS DETECTING DEVICE

[75] Inventors: Hideomi Takeda; Kazuo Kikuchi, both of Tokyo, Japan

[73] Assignee: Asahi Kogaku Kogyo Kabushiki Kaisha, Tokyo, Japan

[21] Appl. No.: 629,433

[22] Filed: Nov. 6, 1975

[30] Foreign Application Priority Data

Nov. 7, 1974 Japan .................. 49-128384

[51] Int. Cl.² .............................................. G02B 23/02
[52] U.S. Cl. ...................................... 354/25; 250/201; 250/204; 352/140; 354/60 E
[58] Field of Search ............ 354/25, 60 E, 60 L; 352/140; 250/201, 204, 578, 234; 355/56

[56] References Cited

U.S. PATENT DOCUMENTS

| | | | |
|---|---|---|---|
| 3,529,528 | 9/1970 | Leitz | 354/25 |
| 3,857,031 | 12/1974 | Sinclair et al. | 250/201 |
| 3,883,689 | 5/1975 | Mansour et al. | 250/201 |
| 3,946,222 | 3/1976 | Swanberg | 250/204 |
| Re. 27,817 | 11/1973 | Craig | 250/204 |

FOREIGN PATENT DOCUMENTS 2,105,288 9/1971 Germany ......................... 354/25

*Primary Examiner*—L. T. Hix
*Assistant Examiner*—J. A. LaBarre
*Attorney, Agent, or Firm*—Sughrue, Rothwell, Mion, Zinn and Macpeak

[57] ABSTRACT

A focusing device for providing an indication of the in-focus condition of a lens relative to a scene and a focal plane, $F_0$. An a.c. bridge circuit includes photoelectric elements in two legs thereof; the elements being physically positioned just in front and just behind, respectively, of focal planes $F_1$, $F_2$ which are optically at the same distance from the lens as focal plane $F_0$. An a.c. input voltage is applied to the bridge, and the output therefrom is an a.c. voltage which has a phase and an amplitude dependent upon the differential amount of light impinging on the first and second photoelectric elements. As the focal plane of the lens moves from a plane in front of $F_0$ to a plane behind $F_0$, the a.c. amplitude goes from maximum at phase 0° to minimum at phase 180°, passing through zero amplitude when the lens is positioned to cause the light from the scene to be focused exactly at $F_0$.

5 Claims, 7 Drawing Figures

FOCUS DETECTING DEVICE

BACKGROUND OF THE INVENTION

The present invention relates to a focus detecting device for use in an optical device, such as a camera, a slide projector and the like.

The practical realization of a focus detecting device or an automatic focus control device has been earnestly sought because it would not only eliminate the differences in the focus control operations as carried out by different individuals, but would also provide for simplified operation of optical devices. Although several such devices have been proposed, most have not yet reached the stage of experimentation because they have not taken into account practical problems which often arise. Especially for cameras, it is important to have reduced size and weight as well as reduced consumption of electric power. An additional indispensable condition for a focus detecting system used in a camera is that it be free from any influence of blur due to handling and flickering in the brightness of an object. Unfortunately, optical information detected by a photoelectric element of a focus detecting device is known to include, not only the necessary information for focus control, but also noise resulting from handling blur and the brightness flickering.

In the invention of Japanese Patent Publication No. 487,934, for instance, the detection is carried out by the use of a DC bridge circuit, although an optical system similar to that of the present invention is employed. As a result, the focus detection becomes unstable since it is subject to influences from the handling blur, dispersion and characteristic inconsistency of the photoelectric element, and other noise. Moreover, the published invention is disadvantageous in that the electric processing of its detected signal is difficult since the signal is of d.c. characteristic. These disadvantages form a major cause for preventing the focus detecting device from being put into practice, and the device cannot exceed the stage of experimentation.

SUMMARY OF THE INVENTION

It is, therefore, an object of the present invention to provide a focus detecting device which requires no moving elements such as an electric motor, is not only compact and light but has a low power consumption rate, is free from any influence caused by handling blur or brightness flickering of an object, and can be built in an optical device of small size. For this object, two photoelectric elements are arranged, respectively, before and behind two focal planes, which are formed by two corresponding optical path dividers so as to constitute those elements into arms of an a.c. bridge circuit, the output of which is subject to phase discrimination so as to make it possible to detect the position of the focal point of a focusing optical system. According to another feature of the present invention, the photoelectric elements are arranged into arrays. Still another feature of the present invention is that the information as to whether the focusing lens causes the plane of focus to be before or behind the focal planes as indicated to a user of an optical device so as to simplify the focusing of the device. The present invention will now be described in more detail in conjunction with the accompanying drawings.

DETAILED DESCRIPTION OF THE DRAWINGS

Figure 1:
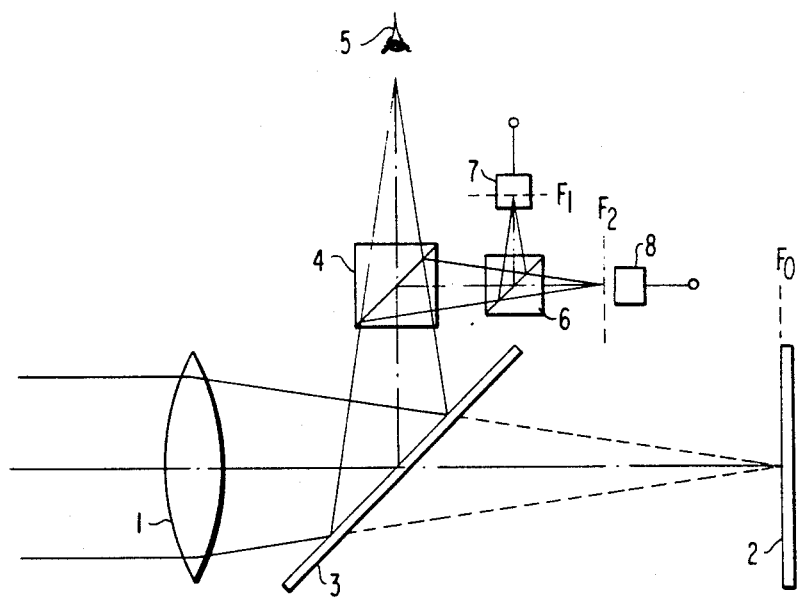
FIG. 1 illustrates one embodiment of an optical system to be used in the present invention.

Referring to FIG. 1, one embodiment of an optical system is illustrated for the case in which a focus detecting device according to the present invention is incorporated into a single lens reflex camera. Light from a scene passes through a focusing lens 1 and is reflected by a quick-return mirror 3 toward the eye 5 of an observer. The scene is observed through a finder optical system (not illustrated). A portion of the flux of light is then oriented by optical path dividers 4 and 6 toward photoelectric elements 7 and 8 which are operative to detect a desired focal point. The letters $F_1$ and $F_2$ respectively indicate focal planes of the lens 1 produced along the respective paths created by optical path dividers 6 and 4. The photoelectric elements 7 and 8 are arranged before and behind of the focal planes $F_1$ and $F_2$, respectively. Indicted at reference numeral 2 is a photosensitive film, which is positioned at a focal plane $F_0$ of the focusing lens 1. All of the focal planes $F_0$, $F_1$ and $F_2$ are optically equidistant from the lens 1.

Figure 2:
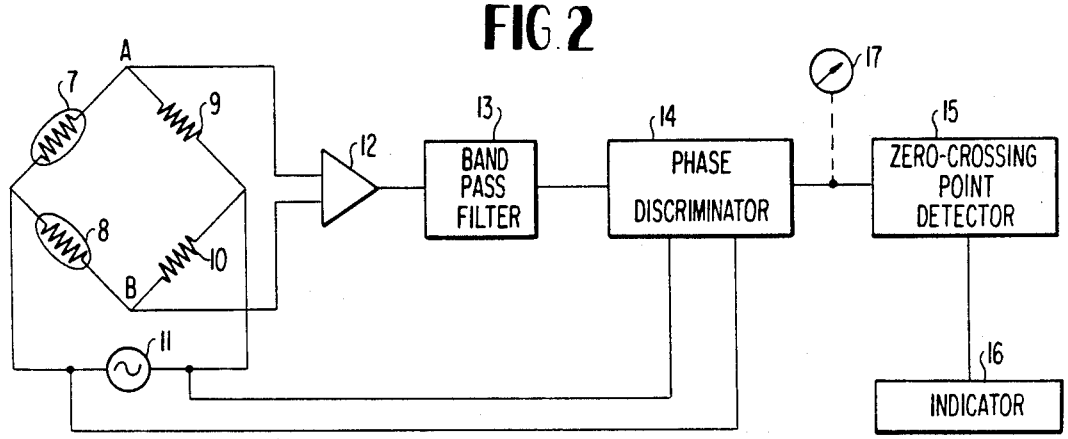
FIG. 2 is a block diagram showing an electronic circuit to accomplish the focus detecting operation in accordance with the present invention.

FIG. 2 shows one embodiment of an electronic circuit for processing a photoelectric signal which is obtained by the afore-mentioned optical system. The photoelectric elements 7 and 8 are arranged to constitute an a.c. bridge circuit together with load resistances 9 and 10 and an a.c. power source 11. The output of the bride circuit is processed by a differential amplifier 12 and a band pass filter 13, and then is subjected to phase discrimination by a phase discriminator 14. The output of the phase discriminator 14 has its zero-crossing point detected by a zero-crossing point detector 15 and displayed by an indicator 16.

For the purpose of explaining the operation of the invention let it be assumed that a real image of an object is focused through the lens 1 onto the photoelectric elements 7 and 8.

Also assume the lens is moved by conventional means from a focus position of infinity to a focus position of short range. The amount of light impinging on elements 7 and 8 will vary in accordance with the curves $a$ and $b$ of FIG. 3. Note, elements 7 and 8 will receive peak light intensity at lens positions just before and just after the lens position that will provide substantially exact focusing on plane $F_0$. The curves cross at the point where the lens is positioned to focus the scene substantially exactly on plane $F_0$. The curves also are representative of the amplitudes of the respective a.c. voltages at output terminals A and B relative to the voltage at the junction of resistors 9 and 10, i.e., as the light intensity increases on element 7, the voltage drop across resistor 9 increases. The fact that the curves $a$ and $b$ are located at symmetrical positions with respect to the focal plane $F_0$ results from the fact that the photoelectric elements 7 and 8 of the optical system shown in FIG. 1 are arranged at equal distances before and behind the focal planes $F_1$ and $F_2$, respectively. Incidentally, the excitation frequency of the a.c. bridge circuit is present at a level equal to or larger than several kHz for the purpose of eliminating the noise frequency caused by the handling blur, which is lower than several hundred Hz.

Figure 3:
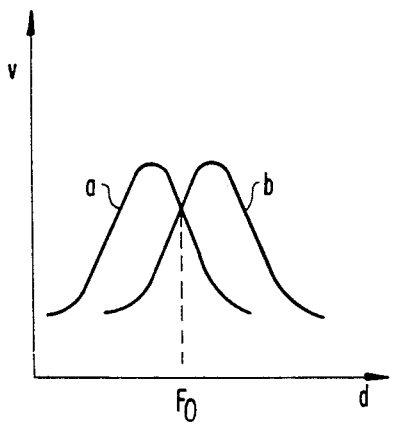
FIG. 3 is a graphical presentation of the respective outputs $a$ and $b$ of the photoelectric elements 7 and 8, in which reference letters $d$ and $v$ designate the displacement of the lens 1 and the outputs of the elements in terms of an a.c. amplitude, respectively.
Figure 4:
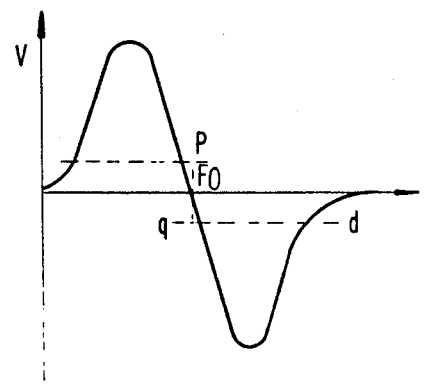
FIG. 4 is a graphical presentation showing the output of the differenctial amplifier 12 in terms of the a.c. amplitude V, in which reference letters $p$ and $q$ designate threshold values for display.

The output of the a.c. bridge circuit is subjected to differential amplification by the use of the differential amplifier 12, whose output is shown in FIG. 4 in terms of the a.c. amplitude V. As is apparent from FIG. 3, when the focal plane of the lens 1 is positioned before or behind the focal plane $F_0$, a difference is established between focus matching signals to be received by the respective photoelectric elements 7 and 8, thus producing an unbalanced condition in the a.c. bridge circuit. On the other hand, where the two focus matching signals take the same value, a balanced condition is established at the focal plane $F_0$. Thus, the output of the differential amplifier 12 follows the curve which has its polarity inverted before and behind the focal plane $F_0$, as shown in FIG. 4. Such characteristics of the differential output can be used as a signal for clearly indicating the focusing position, as will be described in more detail.

It should be noted that there are distinct advantages resulting from the use of the a.c. bridge circuit and the differential amplifier. Generally speaking, the focusing operation during photography is inevitably accompanied by the handling blur, and it is technically difficult to avoid its influence with use of a single photoconductive element. In this respect, it should be appreciated as an advantage of the present invention that there are arranged before and behind two focal planes two photoelectric elements, the outputs of which are differentially amplified to eliminate such noise components as might otherwise be included due to the handling blur. As is apparent from FIG. 4, moreover, it should be appreciated as another advantage that the outputs of the respective elements are differentially amplified so as to insure such an effect as could be obtained by differentiating the focus matching signal for the case of a single element, thus making it possible to accomplish the desired focus detection with high sensitivity. As should be appreciated as still another advantage, the electric processing of the outputs and/or signals is carried out in an a.c. manner with a result being increased feasibility, thus making it possible to accomplish the desired focus detection in a highly stable manner in comparison with focus detection using the conventional d.c. processing. It should be appreciated as a further but major advantage that the influence of the handling blur can be minimized by making the excitation frequency of the a.c. bridge circuit higher than the frequency at which the handling blur takes place.

Figure 5:
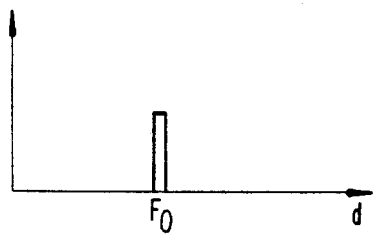
FIG. 5 is a graphical presentation of the output of the zero cross-point detector.

The electric processing of the output of the differential amplifier 12 will now be described. The output is processed by the bandpass filter 13 which has a center frequency equal to the excitation frequency of the bridge circuit. The output thus processed is then introduced into the phase discriminator 14, where it is subjected to phase discrimination by an a.c. signal supplied to the bridge circuit. The output of the phase discriminator 14 is known to behave in a manner to describe a curve similar to that of FIG. 4. That is, the amplitude depends on the amplitude of the a.c. input signal and the polarity depends upon whether the input from filter 13 is in phase or 180° out of phase with the a.c. source signal. If the curve of FIG. 4 is used to described the output characteristic of discriminator 14, the ordinate represents direct voltage amplitude rather than a.c. voltage amplitude, as in the case of the output of amplifier 12. The polarity is inverted at points before and behind the focal plane $F_0$. The output signal thus obtained is processed by the known zero crossing-point detector 15, and is introduced into the indicator 16 which is composed of an LED or miniature lamp. The zero crossing-point detector 15 is composed of, for example, a window-type comparator, and is made operative to produce a signal of high level in response to an output of the phase discriminator 14 at a level in the vicinity of zero in FIG. 4, that is, where the focal plane of the lens 1 is in the focal plane $F_0$. The output of detector 15, which is illustrated in FIG. 5, is applied to indicator 16. As a result the focus matched condition is clearly displayed.

Figure 6:
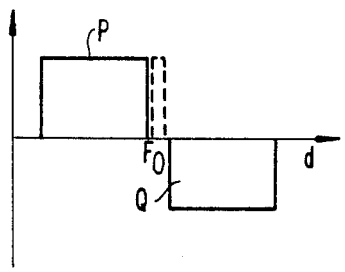
FIG. 6 is a graphical presentation illustrating the electrically processed output for affording the information about the positions before and behind the focal plane, in which reference letters P and Q designate near and distant area, respectively, with respect to the focal plane $F_0$.

Although the above description is directed to a digital display method of the focused position, it wil be apparent to those skilled in the art that an analog display can be carried out if the output of the phase discriminator 14 is applied to a conventional meter 17. The invention may also be provided with an additional feature for providing to the user information about the positions before and behind the focal plane. According to this feature, the output of the phase discriminator 14, which describes the same curve as that of FIG. 4 is easily subjected to electric processing to produce such signals P and Q maintaining a constant level positively and negatively, respectively, before and behind the focal plane $F_0$ as is shown in FIG. 6. This can be accomplished, for instance, by separating the output of the phase discriminator 14 in respect of its polarity and then by subjecting the positive and negative outputs to processing by a comparator which has threshold values shown by broken lines $p$ and $q$ in FIG. 4. The signal as shown in broken lines in FIG. 6 is the same focus matching signal as that of FIG. 5. With the additional feature the signals P, F and Q may be displayed by LED's having blue, red and green colors respectively. The user can therefore determine whether the focus is before or behind the focal plane $F_0$ so that he can accomplish the focus matching operation easily and in a short time period. Specifically, where the blue LED is turned on during the focusing operation, it indicates that the focal plane of the lens 1 is dislocated from the focal plane $F_0$ towards the lens side. Then, to accomplish focus matching the user just brings the lens 1 closer to the focal plane $F_0$ until the red LED is turned on. Where the green LED is turned on, the user moves the lens 1 away from the focal plane $F_0$. The supply of information about the positions before and behind the focal plane is important for improving the operability of the focus detecting device of the present invention.

Figure 7:
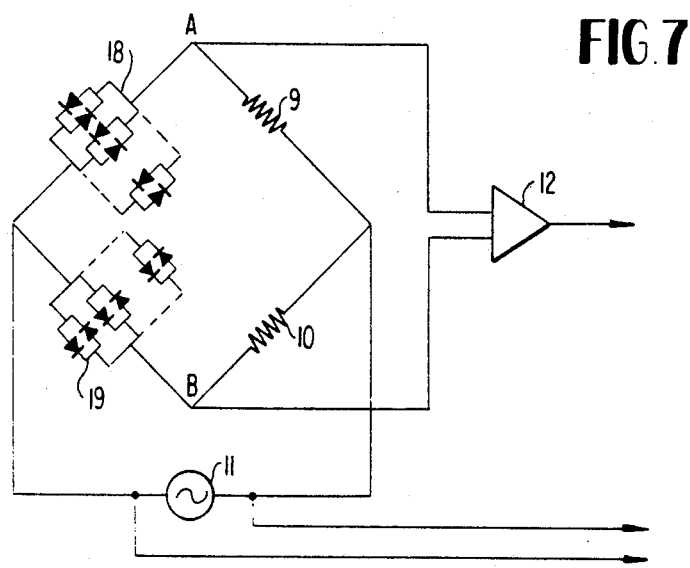
FIG. 7 is a block diagram showing another electronic circuit for accomplishing the focus detecting operation, in which reference numerals 18 and 19 designate photoelectric element arrays.

According to still another embodiment the light receiving portion of the present device is improved by replacing each of the photoelectric elements of FIGS. 1 and 2 with a plurlity of photoelectric elements such a photodiode array so as to detect contrast. This construction is illustrated in FIG. 7. Indicated at reference numerals 18 and 19 are arrays of photoelectric elements, each of which is composed of a plurality of photodiodes and which are arranged at the positions corresponding to those of the photoelectric elements 7 and 8 of FIG. 1. Each element is the photoelectric elements 18 and 19 is so arranged that two elements are electrically connected to have their photocurrents flowing in the opposite direction so as to detect the contrast. Here, it should be noted that any two adjoined elements which are adjacent to each other in respect of electric connection need not be positioned adjacent to each other on the actual light receiving plane. In other words, two elements, which are separated from each other in the photoelectric element array, may be connected in the opposite direction in the manner as shown in FIG. 7. Photoelectric elements electrically connected in opposed relationship are spaced relatively far apart in the receiving plane. This is because widely separate areas offer greater contrast than very close areas. It will be apparent that the photoelectric element arrays can be made of phototransistors.

With such construction, when the lens 1 is moved, there is established between the terminals A and B of the bridge circuit the same signal as that shown in FIG. 3 similarly to the foregoing example. Therefore, the focus matching signal can be obtained at the focal plane $F_0$ by accomplishing the similar processing to those of the foregoing embodiments at the stages subsequent to the differential amplifier 12.

As has been apparent from the above description, highly stable and sensitive focus detection is made possible by the present invention without being subject to the influences of handling blur, the brightness flickering of an object and other noises, merely by constituting the photoelectric elements or their arrays, which are arranged before and behind two focal planes, into an a.c. bridge circuit, and by subjecting the output of the a.c. bridge circuit to phase discrimination. The present invention further features a substantial increase in operability which is effected by the display of information about the positions before and behind the focal plane in accordance with the LED method. As to the construction, the present invention is further featured by its highly practical advantages that the focus detecting device of the invention is compact, light and inexpensive, since it does not require such an electric or moving element, for instance, an electric motor, which requires much consumption of electric power. It is made possible for the first time by the present invention to build a focus detecting device into an optical device of small size, such as, a camera.

Moreover, the present invention can be developed from the above focus detecting device to an automatic focus control device by adding thereto a servoamplifier and a servomotor.

In these ways, the present invention can provide a highly practical focus detecting device, thus remarkably aiding in automization and development of an optical device including a camera.

What is claimed is:

1. In an apparatus of the type having a focusing lens movable relative to a focal plane $F_0$ for focusing light from a scene onto said focal plane and a system for developing an electrical signal indicative of an in-focus condition, the improvement comprising, first light sensing means positioned to sense light, after passing through said lens, in a plane which is positioned optically close to said lens relative to said focal plane $F_0$, second light sensing means positioned to sense light after passing through said lens, in a plane which is positioned optically further from said lens relative to said focal plane $F_0$, and a.c. circuit means, including said first and second light sensing means, for developing a.c. signal having an amplitude dependent upon the diferent amount of light sensed by said first and second sensing means and a phase dependent upon which one of said sensing means senses the greater amount of light, said a.c. circuit means comprising, a bridge network having four legs, said first and second sensing means being the first and second legs of said bridge circuit, and a pair of resistors being the third and fourth legs of said bridge circuit, means for applying an input a.c. voltage of a predetermined frequency between the junction of said first and second sensing means and the junction of said pair of resistors, the output terminals of said bridge circuit being taken between the junction of said first sensing means and one of said pair of resistors and the junction of said second sensing means and the other of said pair of resistors, a differential amplifier means having first and second input terminals, connected respectively to said output terminals of said bridge circuit, and an output terminal, and a bandpass filter connected to the output of said differential amplifier, said bandpass filter having a center frequency substantially the same as said predetermined frequency and being adapted to reject noise frequency caused by relatively slow movement of said apparatus as said lens is focused, said apparatus further comprising phase discriminator means responsive to said developed a.c. signal and said input a.c. voltage for generating an output signal having a voltage characteristic which is substantially zero when said apparatus is in focus and which increases rapidly at opposite polarities when said lens is too far or too close, respectively, to $F_0$ for an accurate in-focus condition.

2. The apparatus of claim 1 further comprising means responsive to the output of said last mentioned generating means for providing an indication when the latter output voltage is substantially at zero volts.

3. The apparatus of claim 2 further comprising light splitting means for directing light which has passed through said lens in at least two optical paths toward imaginary focal planes $F_1$ and $F_2$, each said plane being at exactly the same focal length from said lens as focal plane $F_0$, said first sensing means being in one of said at least two optical paths in front of plane $F_1$, and said second sensing means being in the other of said at least two optical paths and in back of said plane $F_2$, the distance between the first sensing means and $F_1$ being equal to the distance between the second sensing means and $F_2$.

4. The apparatus of claim 1 wherein said first and second sensing means are photoelectric elements.

5. The apparatus of claim 1 further comprising light splitting means for directing light which has passed through said lens in at least two optical paths towards imaginary focal planes $F_1$ and $F_2$, each said plane being at exactly the same focal length from said lens as focal plane $F_0$, said first sensing means being in one of said at least two optical paths in front of plane $F_1$, and said second sensing means being in the other of said at least two optical paths and in back of said plane $F_2$, the distance between the first sensing means and $F_1$ being equal to the distance between the second sensing means and $F_1$.

* * * * *